…

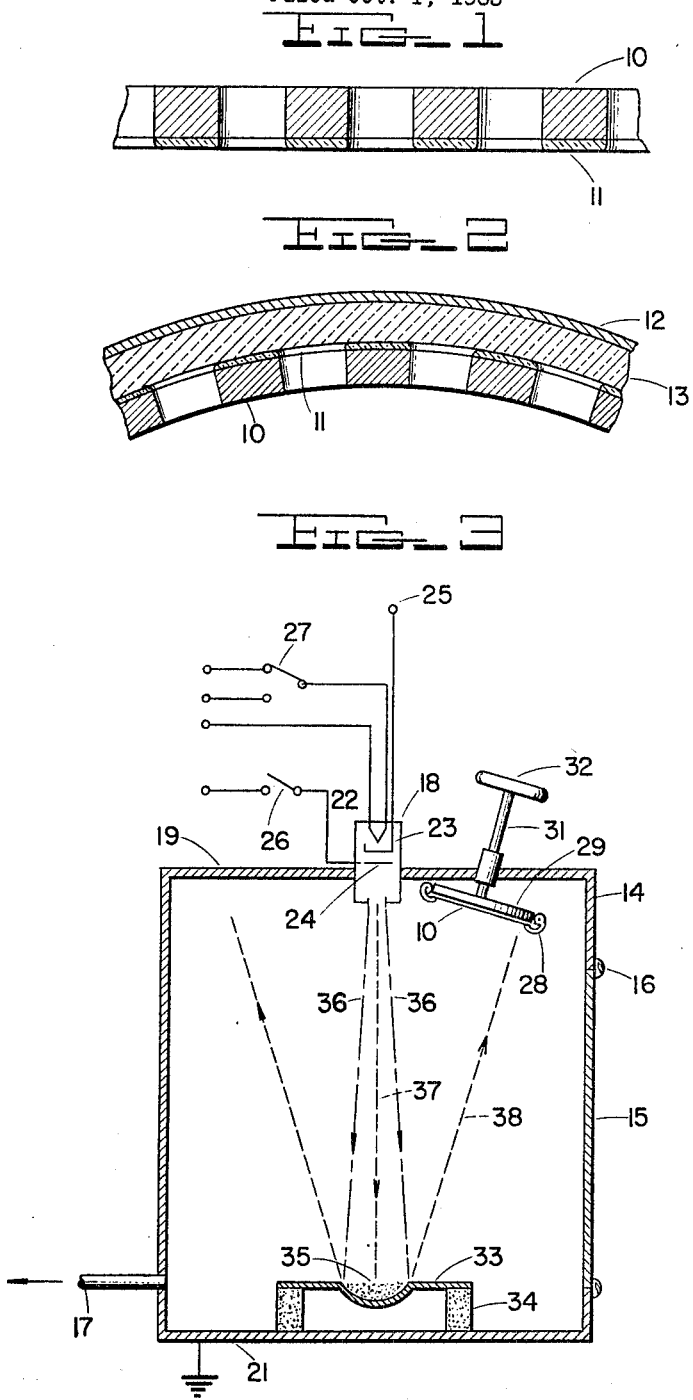

United States Patent Office 3,276,902
Patented Oct. 4, 1966

3,276,902
METHOD OF VAPOR DEPOSITION EMPLOYING AN ELECTRON BEAM
Jimmy M. Abraham, Fort Wayne, Ind., assignor to International Telephone and Telegraph Corporation, Nutley, N.J., a corporation of Maryland
Filed Oct. 1, 1963, Ser. No. 312,929
9 Claims. (Cl. 117—106)

This invention relates generally to methods of vapor deposition and more particularly to a method of vapor deposition of a fusible dielectric material, such as glass, upon a substrate member, such as metal.

There are instances where it is desired to bond or adhere one metallic surface to another metallic surface or to the surface of an insulator, such as glass or a ceramic. As an example, in the fabrication of certain electrical output charge storage tubes, generally referred to as "barrier grid" storage tubes, a target electrode is provided comprising a fine mesh metal grid or screen abutting one side of a dielectric sheet which in turn abuts one side of an electrically conductive surface or backing plate; such a charge storage tube is further described and illustrated in Patent No. 3,015,586 to Michael F. Toohig and Cyril L. Day and assigned to the assignee of the present application.

A common form of barrier grid storage tube, as described and illustrated in said Patent No. 3,015,586, incorporates a target electrode having a generally bowl-shaped of spherical curvature with the dielectric sheet being the form of a layer of fusible dielectric material having the physical properties of glass, bonded to a metal backing plate, as by being deposited thereon by vapor deposition. In order to eliminate microphonics in the tube, it is necessary that the fine mesh metal screen be maintained in intimate engagement with the dielectric material layer and it has been proposed that the screen be adhered to the dielectric layer by heating the same to an elevated temperature approaching its softening point thereby to bond the screen thereto. However, such techniques generally result in the screen sinking into the insulator surface to some extent, a condition to be avoided since it is required, for electrical reasons, that the wall height of the screen be as high as possible. It has also been proposed that the screen be bonded to the insulator surface with the use of ordinary lead solder; the solder is evaporated onto the surface of the screen, the screen is then placed within the insulator surface, and the assembly heated to a temperature sufficient to cause the solder to adhere to the insulator surface. However, the melting points of ordinary lead solders are below the required bakeout temperatures of such tubes, i.e., on the order of 425° C., thus precluding satisfactory bakeout of the tube.

A strong mechanical bond of the fine mesh metal screen to the insulator surface is not required, however, an intimate uniform thickness bond which does not result in the screen sinking into the surface of the insulator and which will further withstand the temperatures encountered in bakeout of the tube, is highly desirable.

It has been proposed to bond the fine mesh metal screen to the insulator surface with a relatively low melting point solder glass which, nevertheless, has a melting temperature substantially higher than the bakeout temperature of the tube. However, prior efforts to deposit a thin coating of solder glass upon one surface of a fine mesh metal screen have been generally unsuccessful; if the evaporation of the glass is conducted too rapidly, the glass frit being evaporated sputters rather than passing into the vapor stage as desired, and on the other hand, if the evaporation is conducted sufficiently slowly to avoid sputtering, the lower melting point constituents of the glass are evaporated first with the result that the three major constituents of the glass are deposited in layers in order of their melting points, rather than uniformly as desired.

It is therefore an object of the invention to provide an improved method of vapor deposition of fusible dielectric material upon a surface.

Another object of the invention is to provide an improved method of vapor deposition of glass upon a metallic surface wherein a uniform deposition of uniform composition is provided.

In accordance with the broader aspects of the invention, an electron beam is directed onto a fused body of the material to be deposited, the beam being rapidly pulsed between upper and lower beam current levels thereby depositing a uniform thickness layer of uniform composition of the material upon the substrate.

The above-mentioned and other features and objects of this invention and the manner of attaining them will become more apparent and the invention itself will be best understood by reference to the following description of an embodiment of the invention taken in conjunction with the accompanying drawings wherein:

FIG. 1 is a fragmentary cross-sectional view showing a fine mesh metal screen, such as employed in the target electrode of a barrier grid storage tube, having a thin layer of glass deposited upon one surface thereof by the method of the invention;

FIG. 2 is a fragmentary cross-sectional view showing the target electrode fabricated with the screen of FIG. 1; and FIG. 3 is a schematic illustration illustrating the apparatus employed in practicing the method of the invention.

Referring now to FIG. 1, there is shown a fine mesh metal screen 10, such as that employed in the target electrode of a barrier grid storage tube, which may for example, have a 400 mesh and a thickness of .8 of a mil, and upon one surface of which it is desired to deposit a relatively thin coating 11 of a suitable low melting point glass, such as a high lead solder glass sold by the Kimbal Glass Company under number Sg–67 and having a softening point of 460° C.; layer 11 may have a thickness on the order of 2 microns.

Referring now to FIG. 2, there is shown a target electrode assembly for a barrier grid storage tube, such as that shown in said Patent No. 3,015,586, comprising a bowl-shaped metal backing plate 12, a dielectric layer 13 bonded to the inner surface of the metal backing plate 12, and the fine mesh metal screen 10 bonded to the inner surface of the dielectric layer 13 by means of the solder glass layer 11. The dielectric layer 13 may, for example, be a relatively high softening point glass, such as that sold by the Corning Glass Company under the No. G12 which softens at 720° C. Thus, after assembly of the fine mesh metal screen 10 with the solder glass layer 11 thereon within the dielectric layer 13, the resulting assembly can be heated to a temperature on the order of 460° C. for a length of time sufficient to soften the solder glass layer 11 thereby causing it to bond to the surface of the dielectric layer 13 without the fine mesh metal screen 10 sinking into the surface.

Referring now to FIG. 3, in order to deposit by vapor deposition the solder glass layer 11 on the fine mesh metal screen 10 in accordance with the method of the invention, a chamber 14 is provided having an access door 15 capable of being sealed, as at 16, and having an exhaust tubulation 17 connected thereto, as shown. A conventional electron gun 18 is provided in the top wall 19 of the chamber 14 directed toward the bottom wall 21. Electron gun 18 comprises a conventional filament 22, cathode 23, and a focusing electrode 24. Electron gun 18 may also include conventional beam accelerating and shaping electrodes, as is well known to those skilled in the art. Cathode 23 is adapted to be connected by lead 25 to a suitable source of cathode potential, such as —10,000 volts and focusing electrode 24 is adapted to be connected by a suitable switch 26 to a suitable source of potential, such as 50 volts. Heater 22 is adapted to be selectively connected to high and low heater voltages, such as 4 and 6 volts, respectively, by a suitable switch 27.

The screen 10, upon which the solder glass layer 11 is to be deposited, is mounted by means of suitable clamps 28 upon a mounting plate 29 in the chamber 14, mounting plate 29 being rotatably mounted by means of shaft 31 having suitable means 32 for manually rotating the same from outside of the chamber 14.

An evaporating boat 33 formed of suitable material, such as tantalum, is supported on the bottom wall 21 of the chamber 14 in any suitable manner, as by carbon blocks 34. A charge 35 of the frit to be deposited in powder form is initially placed in the boat 33, the access door 15 is closed and sealed, and the chamber 14 then is evacuated by means of a suitable vacuum pump (not shown) connected to exhaust tubulation 17 to a suitable vacuum, such as $2 \times 10^{-5}$. Electron gun 18 has been energized with switch 26 opened thus defocusing the electron beam provided by the gun, the filament voltage being adjusted to provide filament current on the order of 25 amps with a resulting defocused beam current on the order of 60 milliamps. The defocused electron beam is thus directed onto the frit 35, as indicated by the dashed lines 36 which will cause complete melting of approximately 40 grams of the powdered frit 35 in approximately 10 minutes.

Electron gun 18 is then deenergized thereby extinguishing the electron beam, the evacuation is terminated, and the thus melted frit 35 allowed to cool to room temperature so that it forms a vitrified or fused body in the boat 33.

Access door 15 is then opened and the fine mesh metal screen 10 upon which the powdered glass layer 11 is to be coated is then secured to the mounting plate 29 by means of the clamps 28. Access door 15 is then closed and the vacuum pump again actuated to evacuate chamber 14, such as to $2 \times 10^{-5}$. Electron gun 18 is then energized and switch 26 closed to provide a highly focused electron beam preferably having a beam diameter no greater than 1/8 inch, switch 27 being initially positioned to provide filament current on the order of 15 amps and resulting beam current on the order of five milliamps. The resulting highly focused, high velocity electron beam is thus directed onto the fused frit 35 in boat 33, as indicated by the dashed line 37.

The switch 27 is then rapidly actuated between its two positions in order rapidly to pulse the filament current between lower and upper levels, such as 15 amps and 25 amps and thus the beam current between the lower and upper levels, such as 5 milliamps and 80 milliamps, at a cycling rate preferably on the order of 1 second. This pulsing of the electron beam 37 is continued until the layer 11 of the desired thickness is deposited on the screen 10, the screen being rotated by means of the hand wheel 32 during deposition in order to provide the requisite uniform deposition. It will readily be understood that the impingement of the electron beam upon the fused frit 35 in the boat 33 causes vaporization of the frit and resulting cosine distribution of the resulting vapor, as indicated by the dashed lines 38.

The pulsing or cycling of the focused electron beam between upper and lower beam current levels, the lower beam current level including turning the beam off entirely, is an essential part of the method of the invention since, if the beam is maintained at a high beam current level for too long an interval, the frit will sputter rather than uniformly vaporizing, and on the other hand, if the beam is maintained at a constant beam current level at which sputtering does not occur, the resulting evaporation is sufficiently slow that the lower melting point constituents of the frit will evaporate before the higher melting point constituents thus depositing these constituents in successive layers, rather than in a uniform composition as desired. The pulsing or cycling of the beam current between upper and lower levels thus permits the frit virtually instantaneously to reach the evaporation temperature of the highest melting point constituent so that a vapor cloud containing all the constituents is provided, while at the same time preventing sputtering of the frit which occurs if the beam current is maintained at such a high level for too long an interval.

While I have described a cycling rate and beam currents found to provide a uniform deposition of Sg–67 solder glass upon a fine mesh metal screen, it will be readily apparent that different cycling rates and a different range of beam currents may be required for uniform deposition of other materials upon other substrates.

While I have described above the principles of my invention in connection with specific apparatus, it is to be clearly understood that this description is made only by way of example and not as a limitation to the scope of my invention.

What is claimed is:

1. The method of vapor deposition of a fusible dielectric material upon a substrate member comprising the steps of: providing a fused body of said material; positioning said member so that the same is exposed to said body and spaced therefrom; directing an electron beam onto said body; and rapidly pulsing said beam between upper and lower beam current levels thereby providing uniform vapor deposition of said material from said body onto said member.

2. The method of claim 1 wherein said material is glass and said member is metallic.

3. The method of claim 1 wherein said beam is pulsed between beam currents of approximately 80 milliamperes and approximately 5 milliamperes at a cycling rate of approximately 1 second.

4. The method of vapor deposition of a low melting point lead solder glass upon one surface of a fine mesh metal screen comprising the steps of: placing a fused body of said glass into a chamber, placing said screen in said chamber and exposing the same to said body at a point spaced therefrom; evacuating said chamber; directing a highly focused high velocity electron beam onto said body; and rapidly pulsing said beam between upper and lower predetermined beam current levels thereby providing uniform vapor deposition of said glass onto said screen surface.

5. The method of vapor deposition of a fusible dielectric material upon a substrate member comprising the steps of: placing a predetermined quantity of said material in powdered form in an open receptacle; directing an electron beam onto said powdered material for a time sufficient to fuse the same; positioning said member so that the same is exposed to said receptacle and spaced therefrom; directing said beam onto said fused material; and rapidly pulsing said beam between upper and lower beam current levels thereby providing uniform vapor deposition of said material onto said member.

6. The method of claim 5 wherein said beam directed onto said powdered material is defocused, and said beam directed onto said fused material is highly focused.

7. The method of claim 5 comprising the further step of cooling said fused material in said receptacle prior to directing said beam thereon.

8. The method of vapor deposition of a fusible dielectric material upon a substrate member comprising the steps of: placing a predetermined quantity of said material in powdered form in an open receptacle in a chamber; evacuating said chamber; directing a defocused electron beam onto said powdered material for a time sufficient to melt the same; terminating said beam and said evacuation and allowing said melted material to cool thereby to form a fused body; placing said member in said chamber and exposing the same to said body at a point spaced therefrom; evacuating said chamber; focusing said beam and directing the same onto said body; and rapidly pulsing said beam between upper and lower predetermined beam current levels thereby providing uniform vapor deposition of said material onto said member.

9. The method of claim 8 wherein said material is a low melting point lead solder glass and said member is a fine mesh metal screen; and wherein said beam is pulsed between beam currents of approximately 80 milliamperes and approximately 5 milliamperes at a cycling rate of approximately 1 second.

References Cited by the Examiner
UNITED STATES PATENTS

| | | | |
|---|---|---|---|
| 2,409,606 | 10/1946 | Leverenz | 117—106 X |
| 2,700,626 | 1/1955 | Mendenhall | 117—106 X |
| 2,803,569 | 8/1957 | Jacobs et al. | 117—107 X |
| 2,866,902 | 12/1958 | Nygard | 250—49.5(7) |
| 3,046,936 | 7/1962 | Simons | 117—93.3 |

ALFRED L. LEAVITT, *Primary Examiner.*

A. GOLIAN, *Assistant Examiner.*